June 24, 1969  J. W. KECK  3,451,472
TWO-STAGE BAFFLE FOR HIGH PRESSURE FEEDWATER HEATERS
Filed Aug. 2, 1967
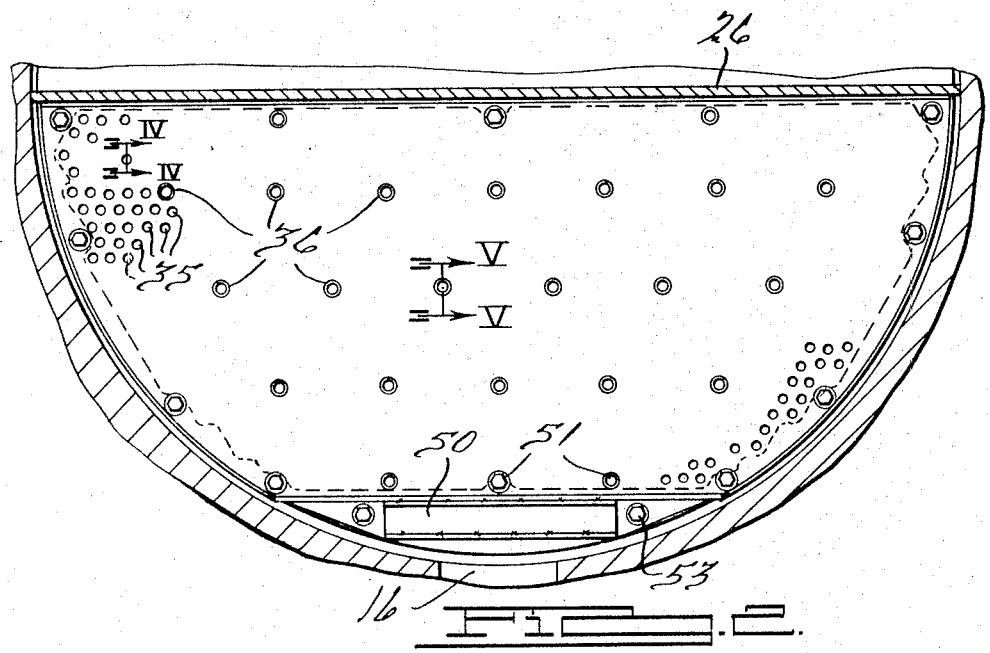
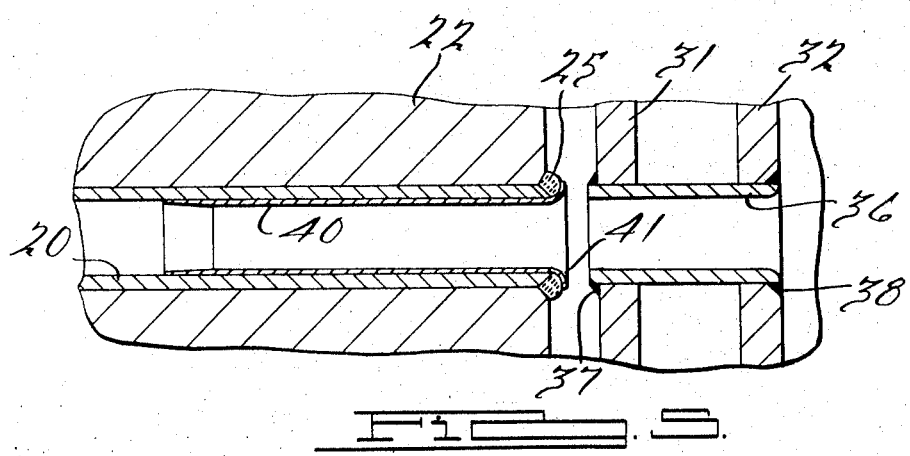
INVENTOR.
Julian W. Keck
BY
Harness, Dickey & Pierce
ATTORNEYS.

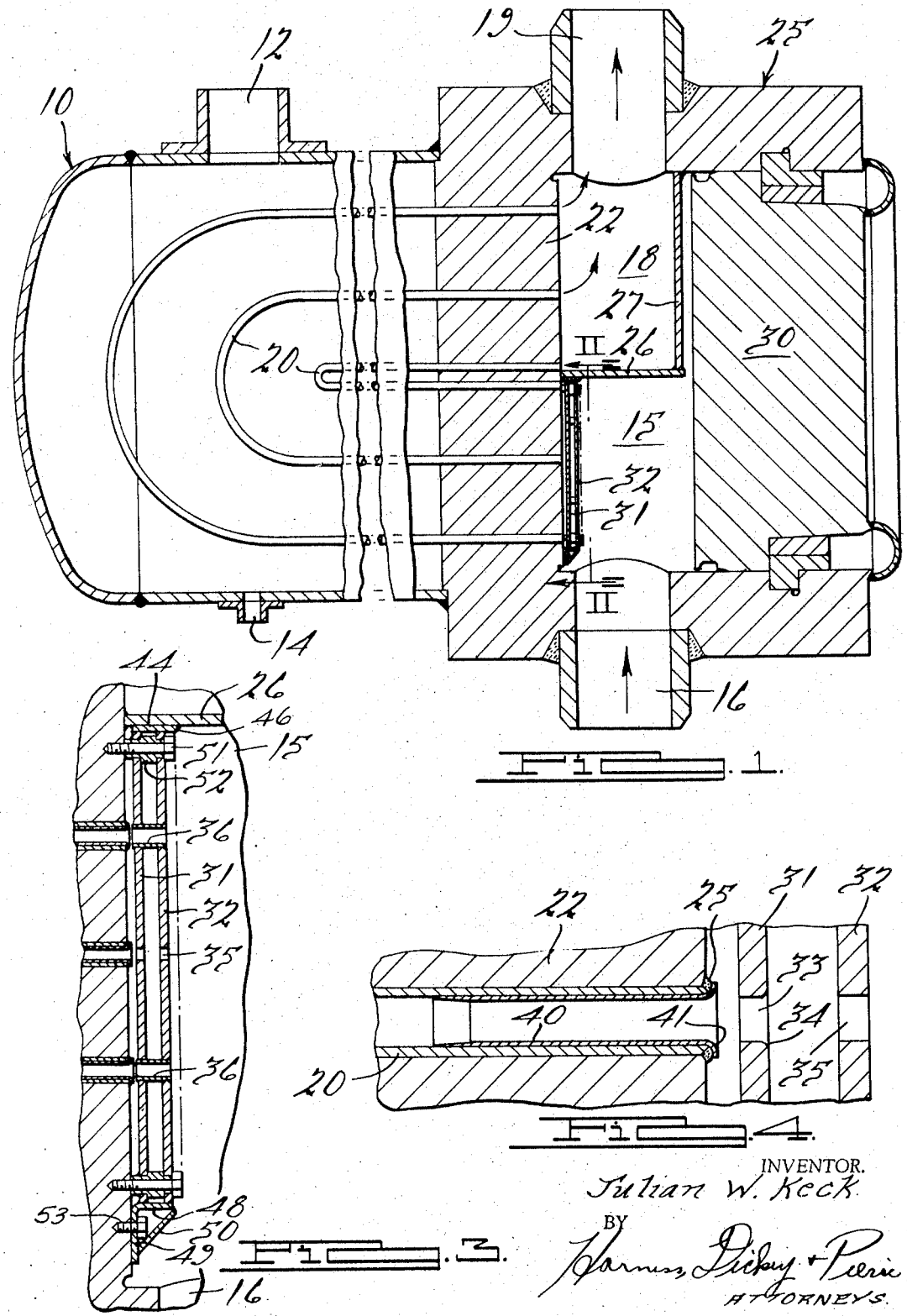

3,451,472
TWO-STAGE BAFFLE FOR HIGH PRESSURE FEEDWATER HEATERS

Julian W. Keck, 2520 San Domingo St., Coral Gables, Fla. 33134
Filed Aug. 2, 1967, Ser. No. 657,952
Int. Cl. F28f 19/00
U.S. Cl. 165—134                         3 Claims

ABSTRACT OF THE DISCLOSURE

In tubular heat exchangers of the type wherein water flows at high velocity into a head from which it must enter a plurality of tubes, one (or more) additional baffling sheets are provided, located between the tube sheet and the water inlet and having a plurality of orificies therein, one such orifice being aligned with each tube inlet. The orifices are smaller in diameter than the tube inlets. Each tube inlet is provided with a protective internal sleeve which projects from the inlet and is flared radially outwardly to partially overlie the inlet tube weld and tube sheet. The sleeves are smoothly contoured to streamline flow.

Background of the invention

Tubular heat exchangers wherein a liquid tends to cause deterioration of the tube sheet and tube inlet areas are very costly to repair in certain types of service, such as feedwater heaters and steam condensers operating at high pressures, temperatures, and/or flow rates. The cost and difficulty of repair results not only from the inherent work involved, but also from the necessity of shutting down related equipment with resultant loss of the operating value of the related equipment, which may for example comprise the boiler components of a large power generating station. Although the amount of metal loss from erosion varies with the severity of turbulence in the inlet water box and the velocity and turbulence of the water entering the tubes and also varies with the composition of the water, costly destructive wastage is a troublesome problem in feedwater heaters serving high pressure steam boilers. The erosion occurs predominantly, with feedwater heaters of conventional construction, on the tube sheet, the tube welds and in the tubes near the inlet ends thereof. It has heretofore been proposed to protect the inlet ends of the tubes by means of sleeves having flared ends and which are individually inserted in the inlet ends of the tubes, with the flared ends of the sleeves projecting radially over the welded juncture between the tube and the tube sheet. Such sleeves are made of highly corrosion resistant materials such as a suitable stainless steel. Since the protective sleeves project from tube sheets, however, they introduce a disadvantageous aspect in that they increase the turbulence of the water in front of the tube sheet, where velocities are already high and, accordingly tend to increase the erosion of the tube sheet, thereby somewhat offsetting their beneficial aspect in protecting the tubes, since, if either the tubes or the tube sheets are materially damaged, a complete reinstallation and/or rewelding of all of the many tubes of the exchanger will be required, and a shut-down of the equipment.

The present invention overcomes the severe erosion problem outlined above, and greatly increases the life not only of the tubes but also of the tube sheet of such a heat exchanger, eliminating the need for frequent repairs of the indicated character.

Other objects and advantages will be apparent upon consideration of the present disclosure in its entirety.

Description of preferred form of the invention

In the drawing:

FIGURE 1 is a diametric longitudinal section, centrally broken away, of a feedwater heater constructed in accordance with the present invention, some of the tubes and related orifices being omitted for clarity of illustration;

FIGURE 2 is a sectional elevational view on a larger scale, taken substantially on the line II—II of FIGURE 1 and looking in the direction of the arrows, some of the tubes and related orifices being omitted;

FIGURE 3 is a section on the same plane as FIGURE 1 but on a larger scale, showing my improved protective and turbulence inhibiting structure;

FIGURE 4 is a similar view on a still larger scale, showing the inlet end of one of the tubes and adjacent parts of the protective members, corresponding to a section taken substantially on the line IV—IV of FIGURE 2 and looking in the direction of the arrows; and FIGURE 5 is a view similar to FIGURE 4 but showing a different tube and an orificed spacing element, taken substantially on the line V—V of FIGURE 2 and looking in the direction of the arrows.

Referring now to the drawing, reference character 10 designates generally a casing which serves as a steam jacket, having a steam inlet 12 and a condensed steam outlet 14 and which is supported by and coacts with a heavy steel casing structure 25 having an integral tube sheet portion 22 which closes the open end of the jacket 10 and defines, in conjunction with a head 30 and partitioning means 26, 27, a water inlet box 15 and a water outlet box 18. Water to be heated is introduced through an inlet 16 opening directly into the bottom of the water inlet box and after passing through the tubes 20 and being heated in the steam space is withdrawn from the outlet box 18 through outlet connection 19.

After entering the inlet box 15, the water turns 90° to enter the tubes 20. Due to the relatively high velocity of water and the turbulence and washing effect on the tube sheet, in a conventional feedwater heater of this character, the tube sheet and tube-to-tube sheet welds incur substantial erosion, and substantial erosion also occurs within the tubes near their inlet ends. In my improved construction direct contact of the turbulent and rapidly flowing water with the face of the tube sheet is prevented and the water is accurately directed into the individual tubes.

A plurality of parallel baffle sheets 31, 32 are provided, overlying and parallel to the tube sheet within the inlet box 15. The baffle sheets are spaced from the tube sheet and from one another and are substantially sealed around their perimeters with respect to each other and the tube sheet. A plurality of individual orifices are provided in the sheets 31, 32, one in alignment with the mouth of each of the heat exchanger tubes 20. The orifices are slightly smaller than the internal diameters of the tubes 20. The orifices 33 of the inner sheet 31 are provided with smoothly rounded or filleted inlets as indicated at 34. The orifices 35 of the outer sheet 32 do not require rounding, and the outer surface of sheet 32 which is directly exposed to the inflowing water in the box 15 is smooth. In areas overlying the tube section of the tube sheet where structural connections between the baffles 31, 32 are desired, the aligned pairs of holes in the baffles are enlarged sufficiently to receive a nipple 36 having an internal diameter corresponding to the desired orifice diameter. The nipples are welded to both of the sheets 31, 32 as indicated at 37, 38 in FIGURES 3 and 5, the external welds 38 to the outer baffle sheet 32 being recessed and smooth to minimize turbulence.

As best shown in FIGURES 4 and 5, a protective sleeve 40 having a flared outer end 41 is provided in the mouth of each of the heat exchanger tubes 20, in order to further protect the entrances of the tubes and the tube-to-tube sheet welds 25. The space between baffle sheets 31, 32 is closed around the edges by metal strip 44 seal welded to both the front and back plates 32, 31 around the entire periphery. Along the top it may also be tack welded to the partition 26, as indicated at 46, while across the bottom the portion near the center takes the form of an angle iron section 48 which furnishes a flange 49 for bolts 53 securing the assembly to the face of the tube sheet, as shown in FIGURE 3. Additional bolts 51 for securing the double baffle sheet assembly to the tube sheet are provided at suitable intervals outside the tubed area, projected through additional aligned holes and interposed spacers 52.

In the lower portion of the water inlet box 15 above the inlet orifice 16, a deflector plate 50 is provided, attached as by welding to the angle 48 and positioned to deflect the entering water into the box with minimum turbulence.

Tests of apparatus constructed as herein disclosed, and of various alternative constructions, have indicated that while the benefit derived from utilizing two baffle plates is much greater than can be achieved if only a single plate is employed, additional baffles do not improve the performance substantially. The erosion of the outer plate 32 is much less than occurs where an unprotected tube sheet is employed, probably due to the fact that there are no projecting tube ends or tube welds to cause turbulence, and to the fact that the orifices through the plates are somewhat restricted and introduce smooth flow characteristics. Also, the streams of water from the orifices enter the tubes with minimum turbulence. The outer baffle 32 may be made of hardened material if the severity of service requires. Since the wear which does occur is confined to the baffle assembly, when replacement does become necessary it can be quickly and inexpensively effected with a minimum of costly down time.

This detailed description of preferred form of the invention, and the accompanying drawings, have been furnished in compliance with the statutory requirement to set forth the best mode contemplated by the inventor of carrying out the invention. The prior portions consisting of the abstract of the disclosure and the background of the invention are furnished without prejudice in an effort to comply with administrative requirements of the Patent Office.

What is claimed is:
1. In a tubular heat exchanger having a liquid inlet box, a tube sheet forming a wall of the box, a plurality of tubes opening into the box through the sheet and joined to the sheet and extending from the same in a direction away from the box, the box having an inlet spaced from the tube sheet, a novel combination of means for inhibiting deterioration of the tube sheet and tubes, and of the joints therebetween, comprising a baffle spaced from and parallel to the tube sheet and interposed between said tube sheet and inlet, said baffle having a plurality of orifices extending therethrough, one such orifice being provided for, and in coaxial alignment with, each tube opening in the tube sheet, and a second parallel spaced baffle interposed between the first baffle and the inlet and having orifices extending therethrough in coaxial alignment with the orifices in the first baffle, each orifice being of lesser cross sectional area than the internal cross sectional area of the tube which is aligned therewith.

2. Means as defined in claim 1 wherein the baffles are plates, and means securing the plates in substantially sealed relation to each other and to the tube sheet along a line extending around all of the tube openings.

3. In combination with means as defined in claim 1, a protective sleeve in each tube having an outer extremity flared to overlie the area of juncture of the tube and tube sheet and having a portion extending into the tube and covering the inner wall of the tube in an area near the tube sheet, the diameters of said orifices being less than the internal diameters of said sleeves.

References Cited

UNITED STATES PATENTS

| 1,699,987 | 1/1929 | Parsons | 165—134 |
| 1,853,189 | 4/1932 | Bancel | 165—174 |
| 3,315,738 | 4/1967 | Jones | 165—134 |

FOREIGN PATENTS

| 1,371,991 | 8/1964 | France. |
| 604,450 | 2/1936 | Germany. |
| 716,795 | 10/1954 | Great Britain. |

FRED C. MATTERN, JR., *Primary Examiner.*

M. ANTONAKAS, *Assistant Examiner.*

U.S. Cl. X.R.

165—174